April 16, 1940.  F. W. JACKSON ET AL  2,197,473
FLOW INDICATOR
Filed Oct. 14, 1937
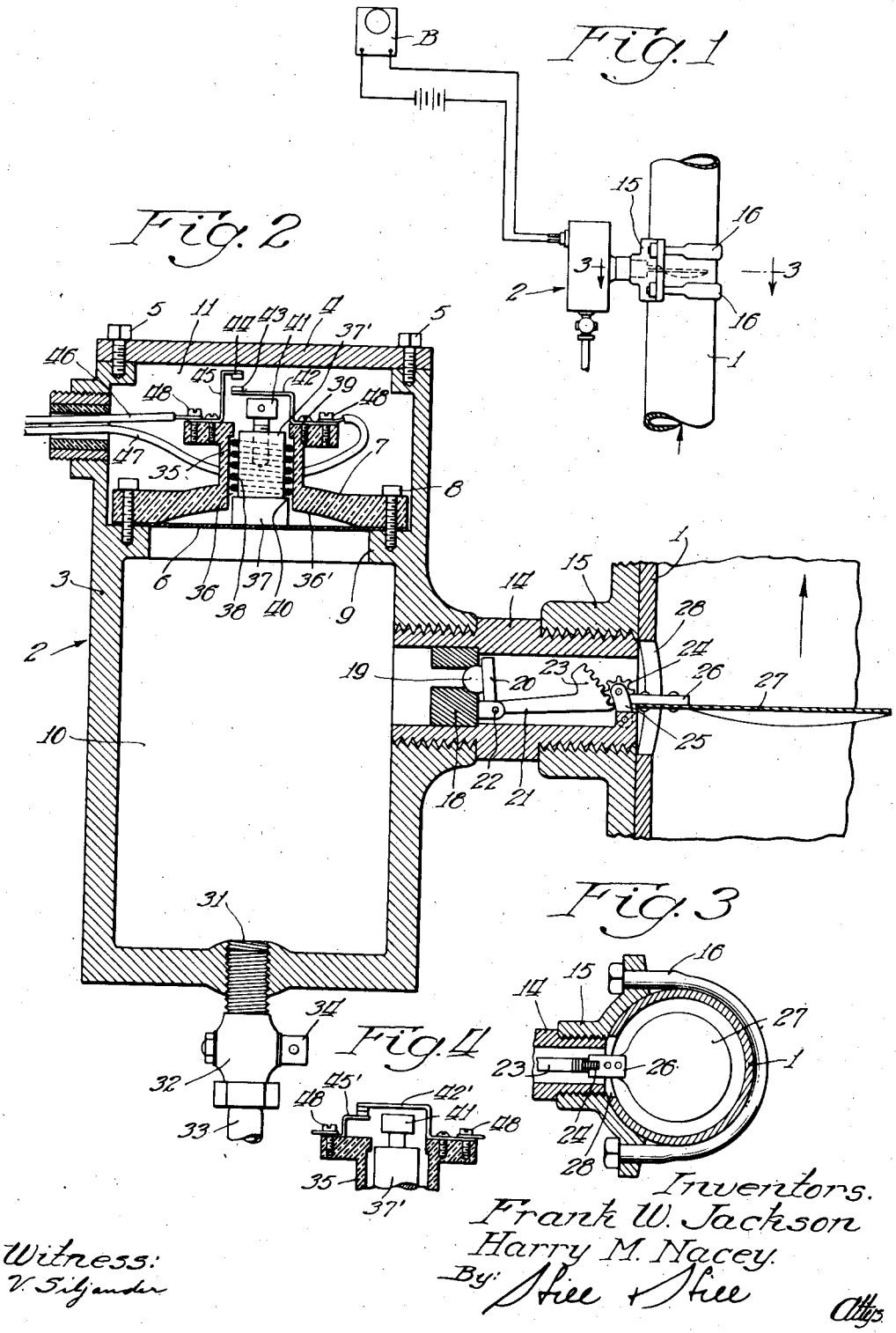
Witness:
V. Siljander
Inventors.
Frank W. Jackson
Harry M. Nacey.
By Hill & Hill
Attys.

Patented Apr. 16, 1940

2,197,473

UNITED STATES PATENT OFFICE 2,197,473

FLOW INDICATOR

Frank W. Jackson and Harry M. Nacey, Chicago, Ill.

Application October 14, 1937, Serial No. 168,980

7 Claims. (Cl. 200—83)

Our invention relates to that general class of devices known as flow indicators, and relates more particularly to a fluid controlled indicator of retarded type which can be controlled or regulated so as to affect opening or closing of an electrical circuit, delaying the opening or closing of the circuit for a desired predetermined interval of time. The device is particularly intended to automatically indicate by means of an alarm, signal or the like at a desired point as to the location in any open or closed fluid system of the existence of any movement, flow or variation in flow conditions or lack of movement. The same is particularly adapted to a piping system and to tanks, cisterns, vessels and other receptacles in which fluids such as water, oil, gas steam or otherwise may be stored or flowing, the device being adaptable for use in various ways and operable under many and various circumstances, as will be obvious to those skilled in the art.

It will be readily understood that conditions may arise, unexpected or otherwise, such as entrapped air, pulsation, etc., which may cause a momentary flow or movement of fluid through a system and in which event an alarm or signal is not desired. This is particularly the case in automatic sprinklers or in fire prevention systems with stand pipes and mains. An installation of an indicating device in such as this in order to prevent water loss, for example, is highly desirable and necessary to determine at once the flow and origin of the flow, as well as to notify the proper person where and when the flow occurs, whether it may be by accident or otherwise. In the case of a serious conflagration, immediate presence of suitable fire fighting equipment and forces may be necessary, and accordingly a quickly operable and accurate signal is desired. However, it is not desired to be continuously signalling pulsations or slight variations in the flow of fluid where the same does not require a signal and is not due to a normal or emergency flow in the system, requiring indicating that the system has gone into operation.

It is one of the principal objects of our invention to provide means which is automatically operable for indicating or signalling, preferably at a point remote from the place of occurrence, the location of any such flow or increased flow or cessation of flow in any open or closed fluid containing instrumentality, whether the fluid be under pressure or otherwise, but to retard the operation of the signal for a predetermined interval to avoid the giving of false or unnecessary signals.

A further object is the immediate indication at a point remote from the place of occurrence of the opening of a normally closed or the closing of a normally open fluid containing system. In practice our flow indicator or signal device is provided with means located within the fluid container and actuated by a fluid flow, increased flow or cessation of flow, depending upon the nature of the system, so as to operate circuit controlling means in an electric wiring system, thereby transmitting the signal in any desired manner, as by a call, code, bell or enunciator, so that the proper person or persons will be immediately informed of the condition. The wiring system itself may be of any conventional form and may be designed to transmit any selective signals over a fire alarm circuit in connection with any local fire department, private fire department or to any part of the building or buildings in which the device is installed, the same to be arranged in a closed or an open circuit of a supervisory system, with the indicator means located wherever desired. More particularly the invention provides a housing having a chamber communicating with the fluid container or conduit and an inlet through a part provided with a brass, bronze, wire, monel, metal, rubber or other suitable valve seat with a valve and valve or closure control, i. e., adapted either to open or close as the case may be by the movement of an impellor, paddle or the equivalent arranged with the container, viser or conduit. The housing has an outlet port communicating with a drain provided with a valve that will control the accumulation of and discharge of water or other fluid entering the housing from the conduit or container into the compartment to determine the time of operation of the circuit controller after a fluid has established a flow in the container. The housing is provided with a diaphragm or flexible partition so as to provide one compartment with the port and outlet and a separate compartment within which is arranged a circuit controller. By controlling the admission and discharge of fluid from the housing compartment the circuit controller is controlled and its operation delayed or retarded to a desired extent. While for convenience the circuit controller is arranged within the housing, it may be at the exterior thereof. The housing itself may be located remote from the container or conduit and connected thereto by suitable piping and one housing may be connected with more than one container.

Our invention has among its other objects, the production of a device of the kind described that is simple, compact, inexpensive, efficient, durable, readily installed and thoroughly dependable.

Many other objects and advantages of the construction herein shown and described will be obvious to those skilled in the art from the disclosure herein given.

To this end, our invention consists in the novel construction, arrangement and combination of parts herein shown and described, and more particularly pointed out in the claims.

In the drawing, wherein like reference characters indicate like or corresponding parts:

Fig. 1 is a view in elevation of a flow indicator illustrating the installation;

Fig. 2 is a sectional view through the flow indicator;

Fig. 3 is a sectional view taken substantially on line 3—3 of Fig. 1; and

Fig. 4 is a fragmentary sectional view similar to part of Fig. 2 showing the closed circuit switch.

Referring to the drawing 1 represents a conduit or container for fluid, the flow of which it is desired to indicate. Communicating directly with the conduit or container is a part of the indicating mechanism designated generally by the character 2, the same consisting of a housing 3 provided with a closure 4, which may be secured in place by studs 5 or in any equivalent manner. The housing is divided into two non-communicating compartments by a partition 6 which in the construction shown, is in the form of a flexible diaphragm of suitable material which may be flexed back and forth. As shown, the diaphragm is arranged on the housing flange 9 and secured in place by a part 7 and suitable studs or screws 8 or their equivalents. The partition 6 separates the housing into two non-communicating chambers 10 and 11, 10 providing a fluid chamber and 11 a circuit mechanism chamber. The housing is attached to the conduit 1 with the fluid chamber 10 communicating with the interior of the conduit, the same constituting a fluid accumulator tank or receptacle.

As shown a tubular part or fitting 14 extends between the housing and conduit. It is immaterial how the part 14 is connected to the conduit, a convenient connecting means consisting of a part 15 secured on the conduit by straps 16 and suitable nuts or to any suitable fitting. Arranged within the part 14 is a valve seat 18 provided with a port through the same, which is normally controlled by a valve 19. Movement or flow of fluid in the conduit normally causes the valve to open and upon cessation of the flow, the valve moves to its closed position. A simple construction for controlling the valve is illustrated and consists of an arm 20—21 pivotally supported at 22 within the part 14. The arm 21 is provided with a gear segment 23 meshing with the gear segment 24 on an arm 25 which is pivoted to the part 14 and connected with a part 26 which carries an impeller or paddle 27 projecting into the conduit. This impeller in the preferred construction is more or less resiliently flexible so that in the event any object should pass through the conduit, the impeller may yield and permit its passing and avoid injury and then spring back to normal operative position. When the impeller 27 is raised, 23 and 24 being in mesh, the free end of 21 with the gear teeth is positively moved downward and thereby moves arm 20 and valve 19 to uncover the port, whereby fluid may flow from the conduit through 14 into the chamber 10.

In installing the device, it is only necessary to cut an opening 28 in the conduit and clamp the part 15 in place.

The housing is provided with an outlet 31 preferably at the bottom of lowest point from which extends a drain pipe 33, a valve casing 32 and valve 34 being arranged in the drain pipe so that the flow of accumulated fluid from the housing may be controlled as desired, and the same be discharged rapidly or slowly. The rate may thus be regulated as will be more fully explained hereinafter to determine the interval of time elapsing before a signal is given after there has been a flow of fluid in the conduit. Should the valve 19 close prior to the time the chamber 10 is sufficiently filled with fluid to operate the diaphragm, the indicator circuit controller is not actuated. The time required to accumulate enough fluid in the housing depends upon the length of time the valve 19 is open and the setting of the drain valve 34.

As will be seen by referring to Fig. 2, the part 7 is provided with a tubular part 36 cut away as indicated at 36' so that the diaphragm 6 may be flexed outwardly. Carried on the diaphragm and movable therewith is a member 37, the free end of which is preferably of reduced size so that a spring 38 may be positioned as shown, and engage at one end with a shoulder 39 and at the other end with a shoulder 40, the spring tending to normally move the diaphragm to the position shown in Fig. 2. When sufficient pressure is exerted on the underside of the diaphragm it is moved outwardly. Arranged with the chamber 11 is a circuit controller, which in simple form consists of contacts 43 and 44 carried by yieldable supports 42 and 45 respectively, the two supports being electrically connected with conductors 46 and 47. Binding screws 48 may be provided for securing the conductors to 42 and 45 as shown in the drawing. Arranged to cooperate with the part 42 is an adjustable member 41 arranged at the end of a part 37'. Normally, the contacts, when the circuit is open, would be substantially as shown. When the diaphragm is flexed, however, the part 41 will engage 42 and move it upwardly bringing the contacts 43 and 44 together closing the circuit, thereby ringing the bell B (Fig. 1) or setting an enunciator or otherwise giving a signal. It is immaterial what signal mechanism is used, the bell shown being for purposes of illustration. In Fig. 2, the circuit breaker is for a normally open circuit, while in Fig. 4, is illustrated how the contacts may be arranged for a normally closed circuit. In this case, the contacts are normally together, but when the diaphragm is flexed, 42' is pushed outwardly thereby breaking the circuit.

The operation of the device may be briefly described as follows: Assuming that the same is as shown in the drawings, normally when there is no flow in the conduit or container 1 the valve 19 is closed, the compartment 10 is empty and the circuit controller in the compartment 11 is inoperative. That is, it is either open as shown in Fig. 2 or closed as in Fig. 4, depending upon the type of circuit. Should there be a flow or movement of fluid in the conduit, it will actuate the impeller 27, thereby opening valve 19 and fluid will immediately enter the chamber 10. It will be obvious to those familiar in the art that the device may be employed to indicate lack of movement of the fluid, consequently, where we specify flow or movement, we wish to be understood as meaning either movement or lack of movement. If the flow is merely momentarily or a pulsation in the conduit, it ordinarily would flow out of the housing through the outlet 31 without reaching a sufficient accumulation to move the diaphragm 6. Should it continue for an interval, the level would rise in the housing compartment 10, but unless the interval was long enough to permit the fluid to more or less fill compartment 10, the diaphragm would not be moved. While the device is immediately responsive to changes in conditions in the conduit, the signal mechanism is retarded in action and is responsive only after the desired interval. Obviously, the time required to accumulate fluid in the compartment depends upon the rate of flow of fluid entering the compartment and the rate of discharge through the outlet 31. Of course, it is necessary that the rate of flow through the outlet be less than the rate of flow from the conduit, as otherwise it would not be possible to accumulate enough in the compartment to operate the diaphragm. If the flow, however, is regulated any predetermined time may be required before the fluid in the housing actuates the diaphragm. It is thus possible to set the apparatus, so that the circuit controller may be operated only after a determined length of time of flow in the conduit.

It will be noted that variations in pressure of the fluid in the system does not in any way affect the operation of the device which operates at high or low pressures, since its operation is dependent only on the amount of fluid that is accumulated within the chamber 10. If there is no fluid within the chamber 10, the spring 38 maintains the diaphragm in normal position or retrieves the same as soon as the level of the fluid within the compartment drops.

It will be particularly noted that there is no need for stuffing boxes or glands since there is no communication between the chambers 11 and 10 separated by the partition. The compartment 11 cover need not be sealed, and in fact, the controller may be entirely outside of the housing. The device is readily installed, is simple in construction and operation and may be said to be entirely fool-proof. The circuit controller may be conveniently inspected by removing the cover 4. The device is inexpensive to manufacture and requires practically no maintenance whatever. It may be installed at any convenient point on the conduit 1, being small and compact, it requiring little room in an installation.

Having thus described our invention, it is obvious that various immaterial modifications may be made in the same without departing from the spirit of our invention; hence we do not wish to be understood as limiting ourselves to the exact form, construction, arrangement and combination of parts herein shown and described, or uses mentioned.

What we claim as new and desire to secure by Letters Patent is:

1. A flow indicator of the kind described and in combination, a fluid conduit having an aperture therein, a housing providing a fluid chamber, a tubular fitting adapted to be secured to the side of the conduit adjacent said aperture for connecting said housing and conduit and providing communication between the housing chamber and interior of the conduit, said fitting provided with a valve seat thereon, a valve arranged to cooperate with said valve seat, an impeller arranged within the conduit, connecting means between said impeller and valve for actuating the valve upon actuation of the said impeller by the fluid within the conduit, said housing provided with an outlet from said chamber, a manually operated valve for regulating the rate of flow through said outlet, a circuit controller arranged without said chamber, and means operative by fluid within the chamber for controlling said circuit breaker.

2. In a flow indicator of the kind described and in combination, a fluid conduit, a housing providing a fluid chamber, a tubular fitting connecting said housing and conduit and providing communication between the housing chamber and interior of the conduit, said fitting provided with a valve seat therein, a valve arranged to cooperate with said valve seat, a movable fluid actuated impeller of resilient flexible material arranged within the conduit, means for operatively connecting said impeller and valve for opening the said valve to admit fluid from said conduit to said chamber upon actuation of the said impeller upon movement of the fluid within the conduit.

3. In a flow indicator of the kind described and in combination, a fluid conduit having an aperture therein, a housing providing a fluid chamber, a tubular fitting adapted to be secured to the side of the conduit adjacent said aperture for connecting said housing and conduit and providing communication between the housing chamber and interior of the conduit, said fitting provided with a valve seat therein, a valve arranged to cooperate with said valve seat, a movable fluid actuated impeller of resilient flexible material arranged within the conduit, means for operatively connecting said impeller and valve for opening the said valve upon actuation of the said impeller upon movement of the fluid within the conduit, said housing provided with an outlet from said chamber, and means for manually regulating the rate of flow through said outlet.

4. A flow indicator for connection to a fluid container to indicate the movement of fluid therein comprising a housing, a flexible partition arranged within the housing and dividing the same to provide two associated non-communicating compartments, one compartment in communication with said fluid container, said last-mentioned compartment having an outlet provided with means for controlling the discharge of fluid from the chamber at a predetermined rate of discharge, a tubular fitting providing communication between said container and housing, a valve pivotally mounted in said fitting for controlling the flow of fluid from the container into said compartment, and flexible means pivotally mounted in said fitting and operable by movement of fluid in the container for controlling the said valve, a circuit controller arranged in the other compartment, and means operatively cooperating with said flexible partition for actuating said circuit controller, whereby the flexing of said partition under pressure of accumulated fluid in the compartment is transmitted to actuate the circuit controller.

5. In an alarm device of the kind described for indicating the movement of fluids in a container, a fluid accumulator receptacle having means for connecting the same to a container, said receptacle having a discharge outlet, means for controlling the passage of fluid between the receptacle and said container including a valve interposed between the receptacle and container, and a resilient flexible impeller of a size to project into said container operatively connected to said valve, said impeller responsive to movement of fluid in the container.

6. A flow indicator of the kind described and in combination, a fluid conduit having an aperture therein, a housing providing a fluid chamber, a tubular fitting operatively related to said housing and adapted to be secured to said conduit adjacent said aperture for connecting said housing and conduit and providing communication between the housing chamber and the interior of the conduit, said fitting having a valve seat therein, a valve pivotally mounted in said fitting and operatively related to said valve seat for controlling the passage of fluid from said conduit to said chamber, an impeller positioned in said conduit having connecting means extending through said aperture and pivotally mounted in said fitting and operatively connected to said valve for controlling the movements thereof upon the actuation of the impeller by the movement of fluid in said conduit.

7. A flow indicator of the kind described and in combination, a fluid conduit having an aperture in a side portion thereof, a housing providing a fluid chamber, a tubular fitting operatively related to said housing and adapted to be secured to the side of said conduit adjacent said aperture for connecting said housing and conduit and providing communication between the housing chamber and the interior of the conduit, said fitting having a valve seat therein, a valve-head operatively related to said seat, a bell-crank lever pivotally mounted in said fitting and operatively related adjacent one of its ends to said valve-head and having a gear segment adjacent its opposite end portion, and a flexible resilient impeller positioned in said conduit having connecting means extending through said aperture and pivotally mounted in said fitting, said connecting means including a gear operatively related to the segment on said lever for controlling the movements of said valve-head with relation to said seat upon the actuation of said impeller by the movement of fluid in said conduit.

FRANK W. JACKSON.
HARRY M. NACEY.